July 21, 1964 B. WALKER 3,141,679
VEHICLE SELF-LEVELING DEVICE
Filed Oct. 26, 1961
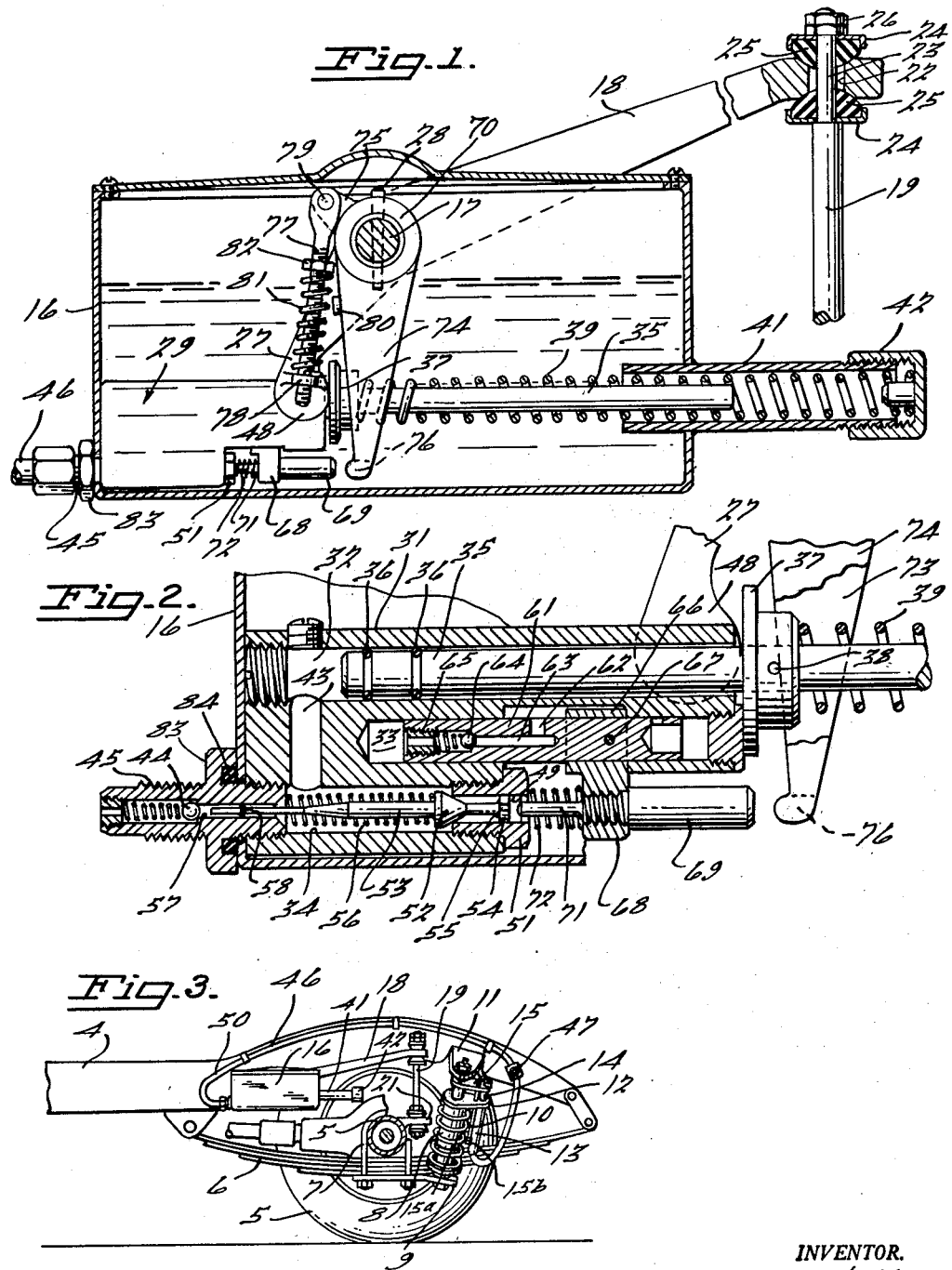
INVENTOR.
Brooks Walker
BY
Harness, Dickey - Pierce
ATTORNEYS United States Patent Office 3,141,679
Patented July 21, 1964

3,141,679
VEHICLE SELF-LEVELING DEVICE
Brooks Walker, 1280 Columbus Ave.,
San Francisco 11, Calif.
Filed Oct. 26, 1961, Ser. No. 147,890
11 Claims. (Cl. 280—6)

This invention relates to self-leveling devices for vehicles and particularly to a self-contained fluid operating device for changing the level of one end of the vehicle when loaded or unloaded.

Various means have heretofore been suggested for providing a height control or leveling devices for a vehicle when excessively loaded. Such devices which are usually manually operated by cables or fluid means and the like to add to the spring support of the vehicle for raising the sprung portion of the vehicle relative to the unsprung portion thereof.

The present invention pertains to a pump which is operated by the movement occurring between the sprung and unsprung portions of the vehicle relative to the amount of deflection of the sprung to the unsprung load to produce a flow of fluid which may be directed to a cylinder for raising the sprung load relative to the springs on the unsprung portion of the vehicle. This provides additional tension to auxiliary springs such as those provided about the shock absorbers or otherwise applied to the vehicle so that irrespective of the amount of load the sprung portion of the vehicle will remain in a substantially horizontal position. Overload means is actuated by the movement between the sprung and unsprung load of the vehicle for interrupting the flow of fluid when the pump is operating and for bleeding off pressure from the supporting cylinder to lower the sprung load relative to the unsprung load. This occurs when the load on the sprung portions of the vehicle is reduced lowering the sprung portion to its normal position which is substantially horizontal.

Accordingly, the main objects of the invention are: to provide self-contained fluid system for producing the self-leveling of a vehicle body on the chassis frame therefor, to provide a self-contained unit having a pump therein which is actuated by the movement between the body and the chassis frame for pumping liquid into a cylinder to load an auxiliary spring and raise the body to a substantially horizontal position; to provide a self-contained device having a pump for self-leveling a vehicle body by supplying fluid to a cylinder with an unloading device which is actuated to shut off the supply of fluid when the body is level and for bleeding off the fluid from the cylinder back into a reservoir within the device when the load on the body has been removed; to provide a self-contained device for pumping fluid by the movement occurring between the body and the chassis frame and directing the fluid into a cylinder connected between a spring about a shock absorber and the body for loading the spring and raising the body to its normal position on the chassis frame, and in general, to provide a self-contained unit for controlling the leveling of a vehicle body relative to the chassis frame which is simple in construction, positive in operation and economical of manufacture.

Other objects and features of novelty of the invention will be specifically pointed out or will become apparent when referring, for a better understanding of the invention, to the following description taken in conjunction with the accompanying drawing wherein:

FIGURE 1 is a sectional view of the self-contained unit for leveling a vehicle body embodying features of the present invention;

FIG. 2 is an enlarged broken sectional view of the structure illustrated in FIG. 1; and FIG. 3 is a broken view in elevation of the rear end of a vehicle showing the sprung and unsprung portion thereof in combination with the device of the present invention.

In FIG. 3 a chassis frame 4 is illustrated as being supported on an axle housing 5 by a leaf spring 6 and U-bolts 7 in the conventional manner. Each side of the chassis frame has a shock absorber 8 supported on a bracket 9 secured by the U-bolts 7 and by a bracket 11 on each rail of the chassis frame. A spring 10 about each shock absorber abuts against a movable plate 12 which supports a cylinder 13 from which a piston 14 extends secured to a bracket 15 which is attached to the bracket 11. Through the movement of the piston relative to the cylinder, the load is increased or decreased on the springs 10 provided about the shock absorbers 8. This produces the raising or lowering of a chassis frame 4 relative to the axle housing 5 for leveling the vehicle body.

The fluid control mechanism is mounted within a reservoir or tank 16 which is secured to the chassis frame or to a cross member provided between the rails thereof. A shaft 17 is journaled in the side walls of the reservoir for pivotal movement relative thereto. An operating arm 18 is secured to the shaft 17 and extends to a position above the axle housing 5 and connected to one end of a rod 19. An arm 21 extends from the axle housing 5 and contains an aperture in alignment with an aperture 22 in the operating arm 18. The ends of the rod 19 are secured for universal movement in the apertures of the arms 18 and 21, as clearly illustrated in FIG. 1. The ends 23 of the rod 19 are reduced in diameter to be smaller than the apertures and are clamped therein by flanged washers 24, rubber grommets 25, and a pair of locking nuts 26.

Any movement occurring between the axle housing and chassis frame causes the rod to move with the axle housing and operate the arm 18 upwardly and downwardly to rotate the shaft 17 an amount proportional to the relative movement between the axle housing and the chassis frame. A bifurcated arm 27 is secured to the shaft 17 by a pin 28 for movement therewith.

A pressure control mechanism 29 is secured to the bottom of the reservoir or tank 16 and is formed of a housing 31 having cylindrical apertures 32, 33 and 34 therein disposed in parallel relation one above the other. In the cylindrical aperture 32 a piston 35 is disposed for axial movement, having O-rings 36 thereon for sealing the piston relative to the wall of the cylindrical aperture. The piston extends from the housing 31 a substantial distance and is provided with a flanged collar 37 which is secured thereto by a pin 38. A spring 39 extends about the extension of the piston and is guided in a sleeve 41 sealed to the wall of the reservoir or tank in exact alignment with the extension and having the outer end closed by a cap 42 which is threaded thereon. The spring urges the piston forwardly within the cylindrical aperture with sufficient pressure to force the fluid therewithin outwardly thereof through a passageway 43 into the cylinder 34, out through a ball check valve 44 in a fitting 45 to a conductor 46 and a branch conductor 47 to the cylinders 13 for extending the piston 14 therefrom. The relative movement between the piston 14 and the cylinder 13 levels the vehicle by increasing the load on the spring 10 in an amount conforming to the excess load carried by the vehicle. When the cylinder 13 reaches the end of its stroke as limited by a rod 15a and nut 15b, the spring 39 cannot drive the piston 35 for any further pumping and the piston 35 remains cocked but no flow of fluid through the check valve 44 takes place and no relief valve is required.

A cam end 48 on the bifurcated arm 27 engages the flange of the collar 37 when the operating arm 18 is raised. When so raised, the bifurcated arm is rotated counterclockwise for moving the piston 35 to the right to compress the spring 39. On the downward movement of the operating arm 18 and the clockwise rotation of the bifurcated arm 27, the spring 39 urges the flange collar 37 and piston 35 to the left, forcing the fluid within the cylindrical aperture 32 outwardly through the passageways 43, the ball check valve 44 and the conduit and branch conduit 46 and 47 respectively to the cylinders 13.

Fluid is admitted to the cylindrical aperture 32 from the reservoir through a passageway 49 of a bushing 51 having a valve seat on its opposite end which is secured to the cylindrical aperture 34. A conical valve 52 on a stem 53 has a guiding head 54 on its forward end disposed within the aperture 49 and provided with cutout portions 55 to permit the fluid to readily pass through the passageway. The valve 52 is urged toward seating position by a light spring 56. The opposite end of the stem extends within a passageway 57 in the fitting 45 adjacent to the ball check valve 44 to be in unseating relation therewith. Spaced guiding projections 58 may be provided on the reduced end of the stem 53 to align it centrally of the passageway. When the piston 35 is moved outwardly of the cylindrical aperture 32, the suction provided thereby will unseat the conical valve 52 against the pressure of the light spring 56 to draw oil from the bottom of the reservoir through the passageway 49 and then into the cylindrical aperture 32. Upon the reverse movement of the piston, the valve 52 will close causing the fluid to be forced outwardly of the fitting 45 past the ball check valve 44 and into the conduits 46 and 47.

A dash-pot effect is produced by a piston 61 within the cylindrical aperture 33. The piston has passageways 62 and 63 communicating with the fluid in the bottom of the reservoir or tank 16. A ball check valve 64 is located in the forward end of the passageway 63 secured in position by a hollow plug 65. Upon movement of the piston 61 to the right, the fluid will enter the passageways 62 and 63 by the suction ahead of the piston and will cause the ball check valve 64 to be unseated so that the fluid may enter the cylindrical aperture 33 in the area ahead of the piston. A collar 66 is secured to the piston 61 by a pin 67, the collar having an arm 68 extending downwardly therefrom and containing a threaded aperture. An operating rod 69 is threaded into the aperture in the arm 68 and is provided with an unseating finger 71 extending forwardly thereof. A spring 72 is disposed between the bushing 51 and the arm 68 about the unseating finger for urging the piston 61 to the right in the position illustrated in FIG. 2. A pair of arms 73 and 74 are joined together by a hub 70 at the top which is disposed in free swinging relation on the shaft 17. The hub is provided with an extending arm 75. At the bottom the pair of arms 73 and 74 are joined by a bumper bar 76 which is disposed adjacent to the end of the operating rod 69.

A threaded rod 77 passes freely through an aperture in a boss 78 on the bifurcated arm 27, with the opposite end secured by a pivot 79 to the extending arm 75 of the hub 70. A spring 81 is disposed over the rod 77 having one end resting upon the boss 78 and the opposite end abutting a nut 82 which is adjustable on the rod to regulate the amount of force applied by the spring to the extending arm 75 which thereby urges the arms 73 and 74 against a boss 80 on the arm 27. Each clockwise movement of the bifurcated arm 27 causes the pairs of arms 73 and 74 to also move clockwise and if the movement between the chassis frame 4 and axle housing 5 has been substantial, the bumper bar 76 will strike the end of the operating rod 69 to urge it and the piston 61 to the left. The piston 61 advances an amount proportionate to the rate of leakage of the fluid between the walls of the cylinder 33 and the piston 61 in the clearance provided therebetween. During the engagement of the bumper bar 76 with the rod 69 the movement of the bumper bar 76 is arrested while the arm 27 compresses the spring 81. The pumping of the fluid into the cylinder 13 compresses the springs 10 and raises the body by the additional support provided thereby. As the space between the chassis frame and the axle housing increases as the body approaches level position, the piston 61 will be urged more and more to the left while being retained in the advanced position between the strokes of the operating arm 18 by the trapped fluid ahead of the piston 61 which leaks thereby at a slow rate. This leveling operation will continue until the unseating finger 71 strikes the guiding head 54 and unseats the cylindrical valve 52 to permit the fluid to surge back and forth in the cylindrical aperture 43 without producing any advancement of the fluid into the conduit 46 and the conduit extension 47. Any further movement to the left of the bumper bar 76 and the operating rod 69 will urge the unseating finger further to the left until the reduced end of the stem 53 will strike the ball check valve 44 and open the fluid circuit through the conduits 46 and 47 and permit fluid in the cylinder 13 to be returned to tank, thereby lowering the chassis frame 4 downwardly relative to the axle housing 5, thus unloading the auxiliary spring 10 provided about the shock absorbers 8. This will occur after the chassis frame has been leveled to a height conforming to the overload on the vehicle body and the removal of the load to permit the body to return to its normal horizontal position. When this occurs, the bumper bar 76 will no longer strike the end of the operating rod 69 for long enough periods to overcome the force exerted by the dash-pot piston 61 and the spring 72. The pressure on the arm 68 will slowly return the piston 61 to the right, moving the unseating finger 71 from contact with the guiding head 54 to permit the valve 52 to again seat on the bushing 51. This again sets up the mechanism to have the piston 35 operate within the cylindrical aperture 32 to force fluid past the ball check valve 44 into the conduits 46 and 47, should the self leveling of the vehicle be necessary thereafter because of the lowering of the frame 4 relative to the axle 5. The fitting 45 has a collar 83 thereon containing an O-ring 84 which seals the collar and fitting to the reservoir.

While the invention is illustrated and described with relation to helical auxiliary springs on shock absorbers, it is to be understood that any spring of the leaf, spiral, torsion and other types alone or when associated with some other device may be similarly employed. The invention can be used to supply oil to the vehicle leveling system which employs oil and captive compressed air.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a self-leveling device for a vehicle having a sprung body mounted on unsprung wheels connected by an axle housing, a reservoir supported on said sprung portion of the vehicle, a shaft provided on the reservoir, an operating arm on said shaft, means connecting the arm to the axle housing for operating said shaft when relative movement occurs between the sprung and unsprung portions of the vehicle, an actuating arm secured to said shaft, a cylinder, a piston in said cylinder having a spring thereon for urging the piston in a direction to force a fluid from the cylinder after the piston has been retracted and the spring compressed by said actuating arm during its movement in the opposite direction, an auxiliary suspension spring for the vehicle, a second piston and cylinder connected between the sprung portion of the vehicle and said auxiliary spring, and a conduit connected to said cylinders to have the former supply fluid to the latter for moving the piston outwardly of the second cylinder to load the auxiliary spring and level the body.

2. In a self-leveling device for a vehicle having a sprung body mounted on unsprung wheels connected by an axle housing, a reservoir supported on said sprung portion of the vehicle, a shaft provided on the reservoir, an operating arm on said shaft, means connecting the arm to the axle housing for operating said shaft when relative movement occurs between the sprung and unsprung portions of the vehicle, an actuating arm secured to said shaft, a cylinder, a piston in said cylinder having a spring thereon for urging the piston in a direction to force a fluid from the cylinder after the piston has been retracted and the spring compressed by said actuating arm during its movement in the opposite direction, an auxiliary suspension spring for the vehicle, a second piston and cylinder connected between the sprung portion of the vehicle and said auxiliary spring, a conduit connected to said cylinders to have the former supply fluid to the latter for moving the piston outwardly of the second cylinder to load the auxiliary spring and level the body, and a check valve between said cylinders.

3. In a self-leveling device for a vehicle having a sprung body mounted on unsprung wheels connected by an axle housing, a reservoir supported on said sprung portion of the vehicle, a shaft provided on the reservoir, an operating arm on said shaft, means connecting the arm to the axle housing for operating said shaft when relative movement occurs between the sprung and unsprung portions of the vehicle, an actuating arm secured to said shaft, a cylinder, a piston in said cylinder having a spring thereon for urging the piston in a direction to force a fluid from the cylinder after the piston has been retracted and the spring compressed by said actuating arm during its movement in the opposite direction, an auxiliary suspension spring for the vehicle, a second piston and cylinder connected between the sprung portion of the vehicle and said auxiliary spring, a conduit connected to said cylinders to have the former supply fluid to the latter for moving the piston outwardly of the second cylinder to load the auxiliary spring to help in leveling the body, a check valve between said cylinders, and a stem having a valve thereon urged by a spring against a seat in a suction passageway from the reservoir to the first cylinder which opens when the piston is retracted.

4. In a self-leveling device for a vehicle having a sprung body mounted on unsprung wheels connected by an axle housing, a reservoir supported on said sprung portion of the vehicle, a shaft provided on the reservoir, an operating arm on said shaft, means connecting the arm to the axle housing for operating said shaft when relative movement occurs between the sprung and unsprung portions of the vehicle, an actuating arm secured to said shaft, a cylinder, a piston in said cylinder having a spring thereon for urging the piston in a direction to force a fluid from the cylinder after the piston has been retracted and the spring compressed by said actuating arm during its movement in the opposite direction, an auxiliary suspension spring for the vehicle, a second piston and cylinder connected between the sprung portion of the vehicle and said auxiliary spring, a conduit connected to said cylinders to have the former supply fluid to the latter for moving the piston outwardly of the second cylinder to load the auxiliary spring and level the body, a check valve between said cylinders, a stem having a valve thereon urged by a spring against a seat in a suction passageway from the reservoir to the first cylinder which opens when the piston is retracted, a dash pot adjacent to the first said piston and cylinder having an unseating finger adjacent to the stem of said valve and a striking head disposed adjacent thereto, swingable arm means on said shaft having an end aligned with said striking head, said swingable arm means having a boss extending therefrom, and a spring pressed rod engaging said boss and said shaft for urging said swingable arm toward said striking head, said unseating finger being advanced to unseat the valve of the stem when the sprung portion of the vehicle is level or the load thereon is reduced and the space is increased between said portion and the axle housing to prevent the delivery of fluid by the first said piston and cylinder.

5. In a self-leveling device for a vehicle having a sprung body mounted on unsprung wheels connected by an axle housing, a reservoir supported on said sprung portion of the vehicle, a shaft provided on the reservoir, an operating arm on said shaft, means connecting the arm to the axle housing for operating said shaft when relative movement occurs between the sprung and unsprung portions of the vehicle, an actuating arm secured to said shaft, a cylinder, a piston in said cylinder having a spring thereon for urging the piston in a direction to force a fluid from the cylinder after the piston has been retracted and the spring compressed by said actuating arm during its movement in the opposite direction, an auxiliary suspension spring for the vehicle, a second piston and cylinder connected between the sprung portion of the vehicle and said auxiliary spring, a conduit connected to said cylinders to have the former supply fluid to the latter for moving the piston outwardly of the second cylinder to load the auxiliary spring and level the body, a check valve between said cylinders, a stem having a valve thereon urged by a spring against a seat in a suction passageway from the reservoir to the first cylinder which opens when the piston is retracted, a dash pot adjacent to the first said piston and cylinder having an unseating finger adjacent to the stem of said valve and a striking head disposed adjacent thereto, swingable arm means on said shaft having an end aligned with said striking head, said swingable arm means having a boss extending therefrom, and a spring pressed rod engaging said boss and said shaft for urging said swingable arm toward said striking head, said unseating finger being advanced to unseat the valve of the stem when the sprung portion of the vehicle is level or the load thereon is reduced and the space is increased between said portion and the axle housing to prevent the delivery of fluid by the first said piston and cylinder, the further advancement of the unseating finger when the sprung portion of the vehicle is unloaded advancing the stem to unseat the check valve and permitting the fluid to flow from the conduit back to the reservoir to thereby permit the sprung portion of the vehicle to lower.

6. In a self-leveling device for a vehicle having sprung and unsprung portions, a reservoir for fluid on said sprung portion, a pump in said reservoir for pumping the fluid from the reservoir due to the movement between said portions, a cylinder and piston on an auxiliary spring loading device mounted between the sprung and unsprung portions to which the fluid is pumped, a check valve for preventing the return of the pumped fluid to the reservoir, a valve stem having a spring thereon for seating the valve thereof in a suction passageway from the reservoir to the pump, and a dash pot having an unseating finger for first opening the valve of the stem and thereafter when further advanced for unseating the check valve should the sprung portion of the vehicle require lowering.

7. In a self-leveling device for a vehicle having sprung and unsprung portions, a reservoir for fluid on said sprung portion, a pump comprising a piston and cylinder on said sprung portion for pumping the fluid from the reservoir, a cylinder and piston on an auxiliary spring loading device mounted between the sprung and unsprung portions to which the fluid is pumped, a check valve for preventing the return of the pumped fluid to the reservoir, a valve stem having a spring thereon for seating the valve thereof in a suction passageway from the reservoir to the pump, a dash pot having an unseating finger for first opening the valve of the stem and thereafter when further advanced for unseating the check valve should the sprung portion of the vehicle require lowering, a spring for urging said pump piston into the pump cylinder to force the fluid therefrom, and means actuated by the movement occurring between the sprung and unsprung portions for retracting said piston and compressing said spring each movement thereof in the same direction.

8. In a self-leveling device, a reservoir for fluid, a pump comprising a piston and cylinder for pumping the fluid from the reservoir to a cylinder and piston on an auxiliary spring loading device mounted between the sprung and unsprung portions of the vehicle, a check valve for preventing the return of the pumped fluid to the reservoir, a valve stem having a spring thereon for seating the valve thereof in a suction passageway from the reservoir to the pump, a dash pot having an unseating finger for first opening the valve of the stem and thereafter when further advanced for unseating the check valve should the sprung portion of the vehicle require lowering, a spring for urging said pump piston into the pump cylinder to force the fluid therefrom, means actuated by the movement occurring between the sprung and unsprung portions of the vehicle for retracting said piston and compressing said spring each movement thereof in the same direction, and additional means operated by the movement occurring between the sprung and unsprung portions of the vehicle for advancing said unseating finger and dash pot when the sprung portion has reached or exceeded a level position, the latter of which retains the advanced position during the reverse stroke of said additional means.

9. In a self-leveling device for a vehicle having a sprung body mounted on unsprung wheels connected by an axle housing, auxiliary supporting means between said sprung body and unsprung wheels, fluid means for loading said auxiliary supporting means and raising said sprung body, a pump having a spring urged plunger connected to said fluid means, means actuated by the movement between said sprung body and axle housing for compressing and releasing the spring which advances the plunger, means connecting said pump to a fluid reservoir, a valve in the connecting means which opens when fluid is drawn into the pump and closes when forced therefrom, and a check valve between said fluid means and pump.

10. In a self-leveling device for a vehicle having a sprung body mounted on unsprung wheels connected by an axle housing, auxiliary supporting means between said sprung body and unsprung wheels, fluid means for loading said auxiliary supporting means and raising said sprung body, a pump having a spring urged piston connected to said fluid means, means actuated by the movement between said sprung body and axle housing for compressing and releasing the spring which advances the plunger, means connecting said pump to a fluid reservoir, a valve in the connecting means which opens when fluid is drawn into the pump and closes when forced therefrom, a check valve between said fluid means and pump and means responsive to the movement between said body and housing for unseating said check valve when said body is level to prevent the delivery of fluid to said fluid means.

11. In a self-leveling device for a vehicle having a sprung body mounted on unsprung wheels connected by an axle housing, auxiliary supporting means between said sprung body and unsprung wheels, fluid means for loading said auxiliary supporting means and raising said sprung body, a pump having a plunger advanced by a spring, means actuated by the movement between said sprung body and axle housing for compressing and releasing the spring, means connecting said pump to a fluid reservoir, a valve in the connecting means which opens when fluid is drawn into the pump and closes when forced therefrom, a check valve between said fluid means and pump, means responsive to the movement between said body and housing for unseating said valve when said body is level to prevent the delivery of fluid to said fluid means, and means for unseating said check valve when the body has moved above level position.

References Cited in the file of this patent
UNITED STATES PATENTS

| | | |
|---|---|---|
| 2,161,431 | Rabe | June 6, 1939 |
| 2,241,826 | Rabe | May 13, 1941 |
| 2,912,235 | Walker | Nov. 10, 1959 |